US008704070B2

(12) United States Patent
Beaty et al.

(10) Patent No.: US 8,704,070 B2
(45) Date of Patent: Apr. 22, 2014

(54) SYSTEM AND METHOD FOR MAPPING AND DISPLAYING AUDIO SOURCE LOCATIONS

(71) Applicant: John Beaty, New York, NY (US)

(72) Inventors: John Beaty, New York, NY (US); Jammal Sawyer, Astoria, NY (US)

(73) Assignee: John Beaty, New York, NY (US)

( * ) Notice: Subject to any disclaimer, the term of this patent is extended or adjusted under 35 U.S.C. 154(b) by 0 days.

(21) Appl. No.: 13/782,402

(22) Filed: Mar. 1, 2013

(65) Prior Publication Data

US 2013/0230179 A1  Sep. 5, 2013

Related U.S. Application Data

(60) Provisional application No. 61/606,428, filed on Mar. 4, 2012.

(51) Int. Cl.
*G10H 5/00* (2006.01)

(52) U.S. Cl.
USPC ............................. 84/616; 84/477 R; 84/654

(58) Field of Classification Search
None
See application file for complete search history.

(56) References Cited

U.S. PATENT DOCUMENTS

| | | | |
|---|---|---|---|
| 4,737,001 A | 4/1988 | Moss | |
| 5,335,011 A * | 8/1994 | Addeo et al. | 348/14.1 |
| 8,396,226 B2 * | 3/2013 | KnicKrehm et al. | 381/58 |
| 8,416,957 B2 * | 4/2013 | Tsujino et al. | 381/56 |
| 2004/0151066 A1 | 8/2004 | Kim et al. | |
| 2006/0156906 A1 | 7/2006 | Haeker | |
| 2006/0206221 A1 * | 9/2006 | Metcalf | 700/94 |
| 2009/0052677 A1 * | 2/2009 | Smith | 381/56 |
| 2009/0123007 A1 * | 5/2009 | Katayama | 381/300 |
| 2010/0110164 A1 | 5/2010 | Kubara | |
| 2010/0150359 A1 * | 6/2010 | Knickrehm et al. | 381/58 |
| 2010/0171743 A1 * | 7/2010 | Hata | 345/440 |
| 2010/0185308 A1 * | 7/2010 | Yoshida et al. | 700/94 |
| 2010/0188929 A1 * | 7/2010 | Kitaura | 367/13 |
| 2010/0189271 A1 * | 7/2010 | Tsujino et al. | 381/56 |
| 2010/0272286 A1 | 10/2010 | Bai et al. | |
| 2011/0081024 A1 * | 4/2011 | Soulodre | 381/17 |
| 2011/0120222 A1 | 5/2011 | Scholte et al. | |
| 2011/0317522 A1 * | 12/2011 | Florencio et al. | 367/129 |
| 2012/0014528 A1 * | 1/2012 | Wang | 381/17 |
| 2013/0016286 A1 * | 1/2013 | Nomura et al. | 348/578 |
| 2013/0120569 A1 * | 5/2013 | Mizuta | 348/143 |
| 2013/0147835 A1 * | 6/2013 | Lee et al. | 345/629 |
| 2013/0163382 A1 * | 6/2013 | Millar et al. | 367/127 |

OTHER PUBLICATIONS

PCT International Search Report and Written Opinion of the International Searching Authority issued Jun. 28, 2013, Application No. PCT/US2013/028866.

* cited by examiner

*Primary Examiner* — Marlon Fletcher
(74) *Attorney, Agent, or Firm* — Sawyer Law Group, P.C.

(57) ABSTRACT

The present invention relates generally to a method and system for defining a reference sound position and producing an indicia proximate thereto in relation to one or more sound characteristics. The present invention, in one or more embodiments, provides for displaying a holographic image at a reference sound location which is determined in relation to the identification of one or more target sounds being associated with one or more identified sound characteristics. In other embodiments, the present invention provides for an indicia to appear to be interactive with a reference sound location and may be used in a variety of environments including but not limited to rock theatrics, homeland security and residential security.

17 Claims, 17 Drawing Sheets

SYSTEM AND METHOD FOR MAPPING AND DISPLAYING AUDIO SOURCE LOCATIONS

CROSS-REFERENCE TO RELATED APPLICATION

This application claims the benefit of U.S. Provisional Patent Application No. 61/606,428, filed on Mar. 4, 2012, entitled "STRETCH TECH ANIMATION SOFTWARE," which is incorporated herein by reference in its entirety.

FILED OF THE INVENTION

The present invention relates generally to a detection of soundwaves and sound pressure, and determining with accuracy the location of sound sources.

BACKGROUND OF THE INVENTION

Sound emanates from a sound source at various rates and in varied directions, in relation to numerous characteristics associated with the sound source, the sound itself, and the environment in which the sound source is in. Sound results from a quickly varying pressure wave travelling through a medium, such as air. As sound travels through air, the air (at atmospheric pressure) varies periodically. The number of pressure variations per second is referred to as the frequency of sound, typically measured in Hertz (Hz) and defined as cycles per second.

Sounds having higher frequencies yield a higher-pitched sound to a listener or detector. For instance, sounds produced by percussion drums typically have much lower frequencies than those produced by flutes. Acoustic instruments in a string section of an orchestra may typically be one of a violin, viola, cello, and double bass, each of which produces its own sound at varying frequencies where overlap may also occur. These instruments may be difficult to hear over electronic sound sources or in an environment having high decibels noise for instance. However, in an orchestral environment, the sounds that emanate from these instruments are often quite discernible from the other instruments in the orchestra, particularly during a performance in an acoustically-oriented venue.

Since sound in acoustic instruments is the product of air pressure created by vibrations of the string, where the strings themselves are inefficient air movers, the design of the body of these instruments is purposeful to act as an amplifier. The body design is thereby able to boost the vibration, air pressure and sound intensity over a lone vibrating string. In such design, the strings are in communication with and vibrate across a bridge with the instrument where the body acts to amplify a suited range of appropriate frequencies which are generated by the vibrating strings. Sound, in relation to the sound source, the type of sound generated, and the environment of the sound source, may then be heard or detected in further relation to the sensitivity of the detector.

However, each part of each instrument's body, in relation to its shape, composition, size, etc., may resonate at different frequencies such that both the tonal character and radiation pattern of the instrument will vary considerably, particularly with frequency. It is recognized that the average polar responses of the violin and cello vary at a range of different frequencies; it is further understood that such instruments also emanate sound in differing ways, where for instance though a majority of sounds comes from the top or front of the instrument, the emanation is dependent on the instrument itself.

Therefore, what is desired is an approach to accurately determine a reference sound source position in relation to one or more targeted characteristics of one or more sound sources in a specific environment, where preferably, once the reference sound source position is determined, further visual indicia and stimuli can be aligned with the reference location to further engage and create viewer benefit.

SUMMARY OF THE INVENTION

The present invention fulfills these needs and has been developed in response to the present state of the art, and in particular, in response to the problems and needs in the art that have not yet been fully solved by currently available technologies.

In one embodiment, the present invention is a method for defining a reference sound position and producing an indicia proximate thereto in relation to one or more sound characteristics at a predetermined location. The method preferably includes: defining at least one sound characteristic to be detected; detecting at least one target sound in relation to the at least one sound characteristic; and determining the referenced sound position in relation to the detected target sound. Further the method provides for producing the indicia proximate to the determined referenced sound position.

In a further embodiment, the present invention is a method for determining a reference sound source location and performing an indicia proximate to the reference sound location, in relation to one or more targeted characteristics of one or more sound sources in a predetermined sound environment. The method includes defining one or more target sound characteristics being one or more of frequency range, decibel level, pitch range, loudness range, directional location, and period of time; defining one or more characteristics of the indicia as being one or more of visible, audible, and/or tactile; detecting at least one target sound in relation to the one or more target sound characteristics in the sound environment; and, determining the referenced sound source location in relation to the detected target sound. Preferably the method also includes assigning the indicia to be performed proximate to the determined referenced sound source location.

In a further embodiment, the present invention is a system for determining a reference sound source location and displaying one or more images proximate to the reference sound location, in relation to one or more predetermined performance characteristics for a sound environment. Preferably, included in the system is a sound detection device for detecting one or more sounds in the sound environment in relation to one or more predetermined performance characteristics; a processor for processing detected sound information in relation to reference sound source location of the sound environment and generating one or more images for display proximate to the reference sound source location; and an image display device for displaying the generated one or more images proximate to the reference sound source location.

As used herein, sound sources or sources of sound may include anything capable of generating or emanating a sound, such as, but not limited to, any of human beings, musical instruments, electronic devices, inanimate objects, naturally-generated sources of sound, artificial sound generators, etc.

DETAILED DESCRIPTION OF PREFERRED EMBODIMENTS

The present invention relates generally to a method and system for defining a reference sound position and producing an indicia proximate thereto in relation to one or more sound characteristics.

The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
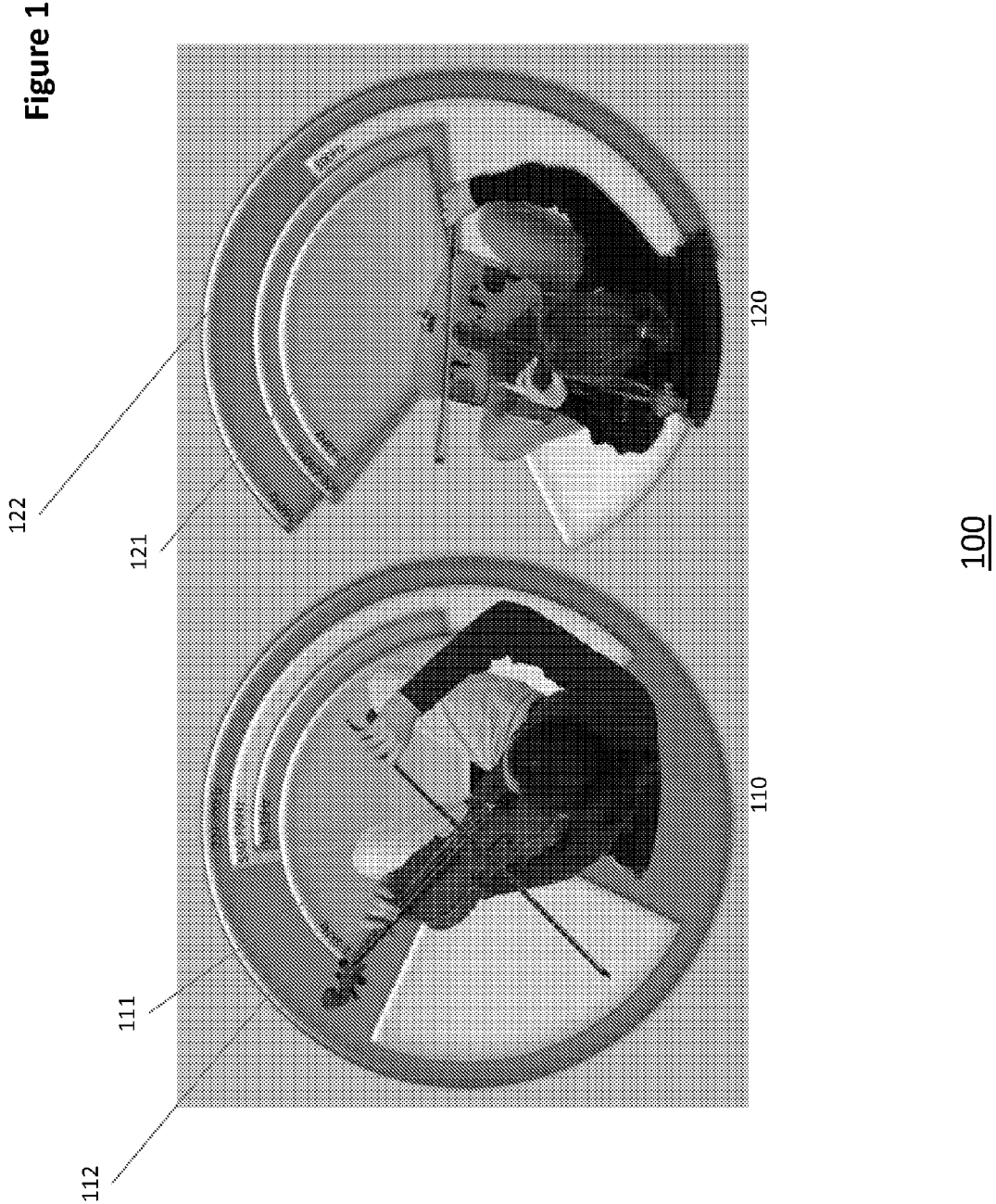
FIG. 1 sets forth a diagrammatic example of the average polar responses of a violin and a cello at a varying range of frequencies.

FIG. 1 sets forth a diagrammatic example 100 of the average polar responses of the violin 110 and the cello 120 at a varying range of frequencies. From FIG. 1, the violin 110 and the cello 120 have similar sound dispersions in the 2-5 kHz range (111, 121), where both generally emanate around a local position of the string and bridge. However, the violin and the cello vary considerable in the sound dispersion in the range of 200-500 Hz, where the violin circumferentially radiates around its local position (112) and the cello radiates only partially (122). As a result, it remains a challenge to determine a specific location or position of a sound source.

Figure 2:
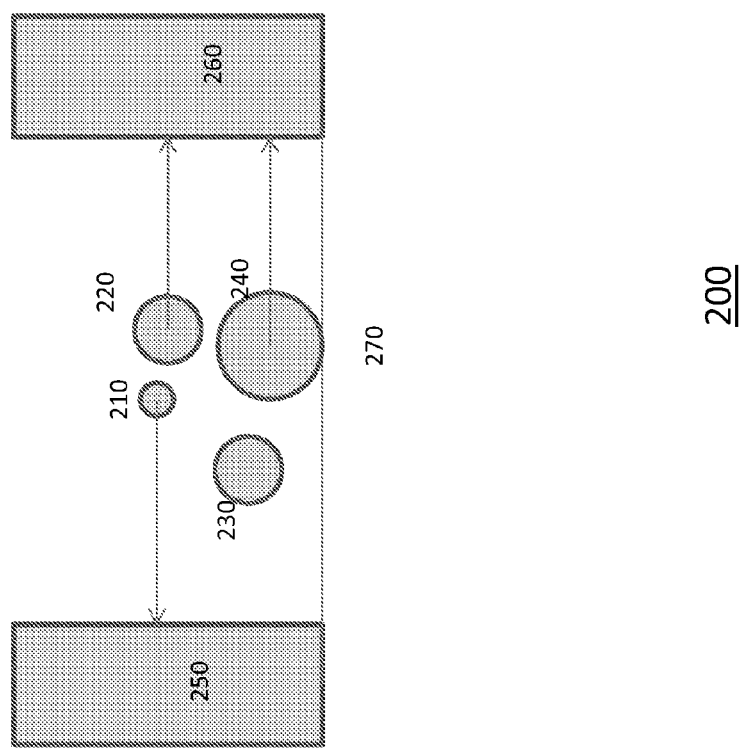
FIG. 2 sets forth a diagrammatic representation of sound sources and locations where listening or detection of the sounds from the sound sources may occur, from a perspective of an audience viewer.

FIG. 2 sets forth a diagrammatic representation 200 of sound sources (210, 220, 230, 240) and locations where listening or detection of the sounds from the sound sources may occur (250, 260), from a perspective of an audience viewer. For example, sound sources (210, 220, 230, 240) may represent a live band at a concert and the viewer of FIG. 2 is in the audience. It is understood that sound travels, when unobstructed, at a rate equivalent to the speed of the sound. It is also recognized that detection locations (250, 260) may be determined to be at a predetermined distance from a sound source. Using a standard relationship of rate X time=distance, calibration techniques may be used to determine whether sound traveling from a sound source is obstructed and whether the equipment being used for detection is located accurately.

From FIG. 2, microphones or other detection equipment may be placed at 250, 260 to detect sounds emanating from the stage area 270. Sound sources 230 and 240 are not equidistant from the detectors 250 and 260, from the Figure. Sound source 230 is located at a first predetermined distance from detector 260 and sound source 240 is located at a second predetermined distance from detector 260. Sound emanating from 230 will reach the detector 260 before sound emanating from sound source 240. However, sound emanating from 230 will reach the detector 250 after sound emanating from sound source 240. While the distance of each of the sound sources from a referenced detector can be determined using calculations associated with the standard relationship, determining with accuracy and specificity a sound source's position remains a challenge due to sound dispersion, sound source movement, and the placement of the detection equipment.

Another characteristic of sound is related to its loudness where loud sounds result from a larger pressure variation which dissipates over distance. As each sound may travel across a room at the speed of sounds, the pressure variation produced by each sound may be affected by competing sounds, time, and the distance the sound travels. In such a setting, determining a particular center point for an aggregated set of sound sources or for a single sound source surrounded by competing sound sources, presents a challenge.

Figure 3:
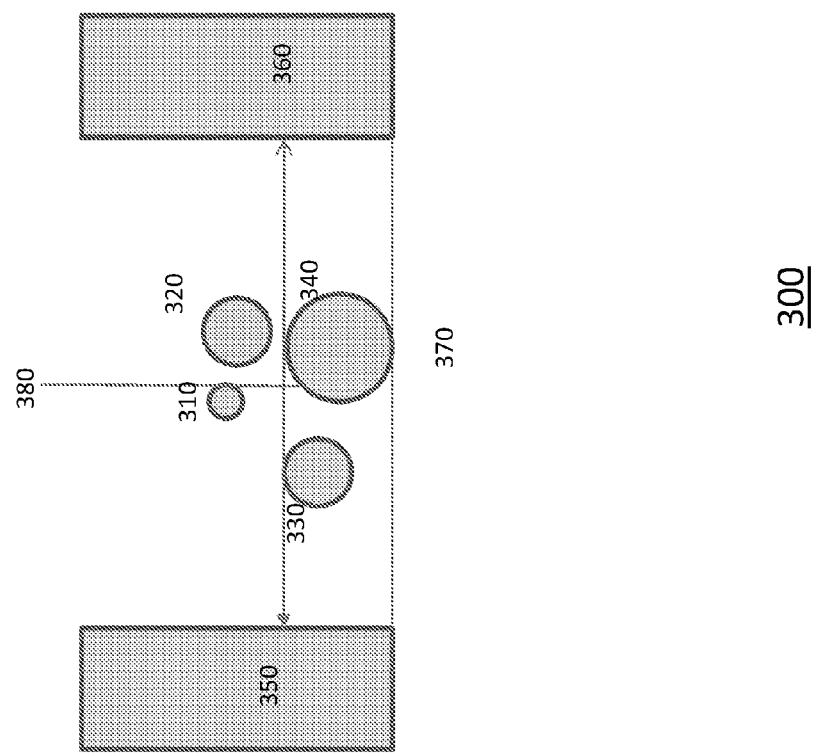
FIG. 3 sets forth a diagrammatic representation of sound sources, locations where listening or detection of the sounds from the sound sources may occur, and a probable center line of where an aggregate sound source.

For instance, FIG. 3 sets forth a diagrammatic representation 300 of sound sources (310, 320, 330, 340), locations where listening or detection of the sounds from the sound sources may occur (350, 360), and a probable center line of where an aggregate sound source. From FIG. 3, each sound source (310, 320, 330, 340) may produce sounds that are of frequencies which overlap varyingly during a performance or presentation. In certain situations, one or more of the sound sources may be a speaker, for instance. A listener may attempt to discern where a particular set of frequencies is emanating from by deploying one or more detection arrays (350, 360).

However, while the distance of each of the sound sources from a referenced detector can be determined using calculations associated with the standard relationship, determining with accuracy and specificity an aggregate center for specific frequency targets or ranges in relation to multiple sound sources is a challenge due to competing sounds, sound dispersion, sound source movement, placement of the detection equipment, and other characteristics. Accordingly, determining where an aggregate center occurs, such as is estimated at 380, is difficult.

Figure 4:
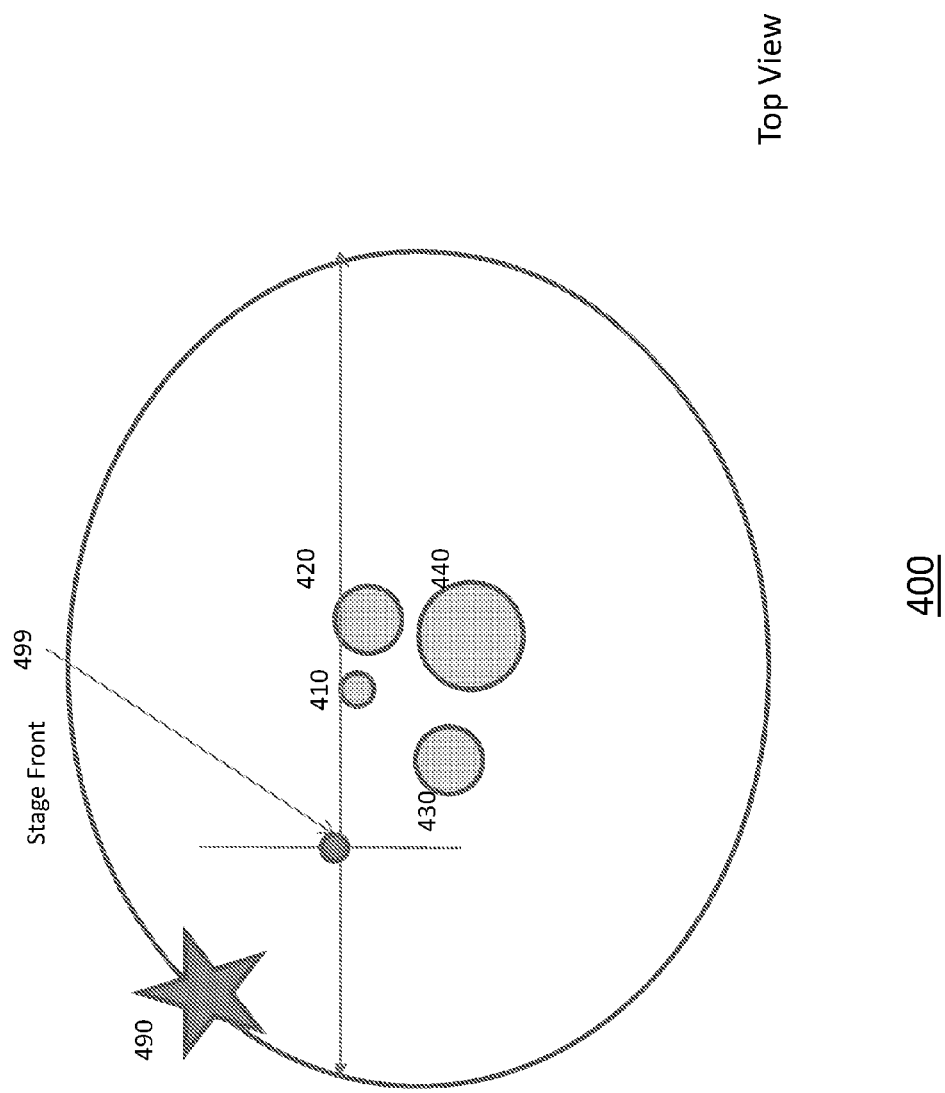
FIG. 4 sets forth an environmental arrangement having multiple sound sources with a listener at a particular location in relation to the multiple sound sources near the front of a stage.

Further, FIG. 4 sets forth an environmental arrangement having multiple sound sources 400 with a listener 490 at a particular location in relation to the multiple sound sources near the front of a stage. From FIG. 4, being an overhead perspective, it may be a desired by the performance event to have the listener 490 focus on specific aspects of the performance at particular times or for particular periods. Unfortunately, using calculations associated with the standard relationship, the listener 490 may likely determine a perceived center point of the aggregated sound sources to be at 499. As a result, the focus of the listener 490 will generally be towards that perceived center point and may not focus towards specific highlights or performance effects that are associated with the sound sources and their specific characteristics. Unfortunately, the listener may not fully engage with the performance for a level of enjoyment as originally intended.

Similarly, an event producer may desire to align a visual feature, for a listener's enjoyment, with specific characteristics related to the sound, sound source and environment of the performance, where accuracy of determining an aligned association between a sound source location and timing information of sounds being or to be emanated from one or more sound sources is required.

Figure 5:
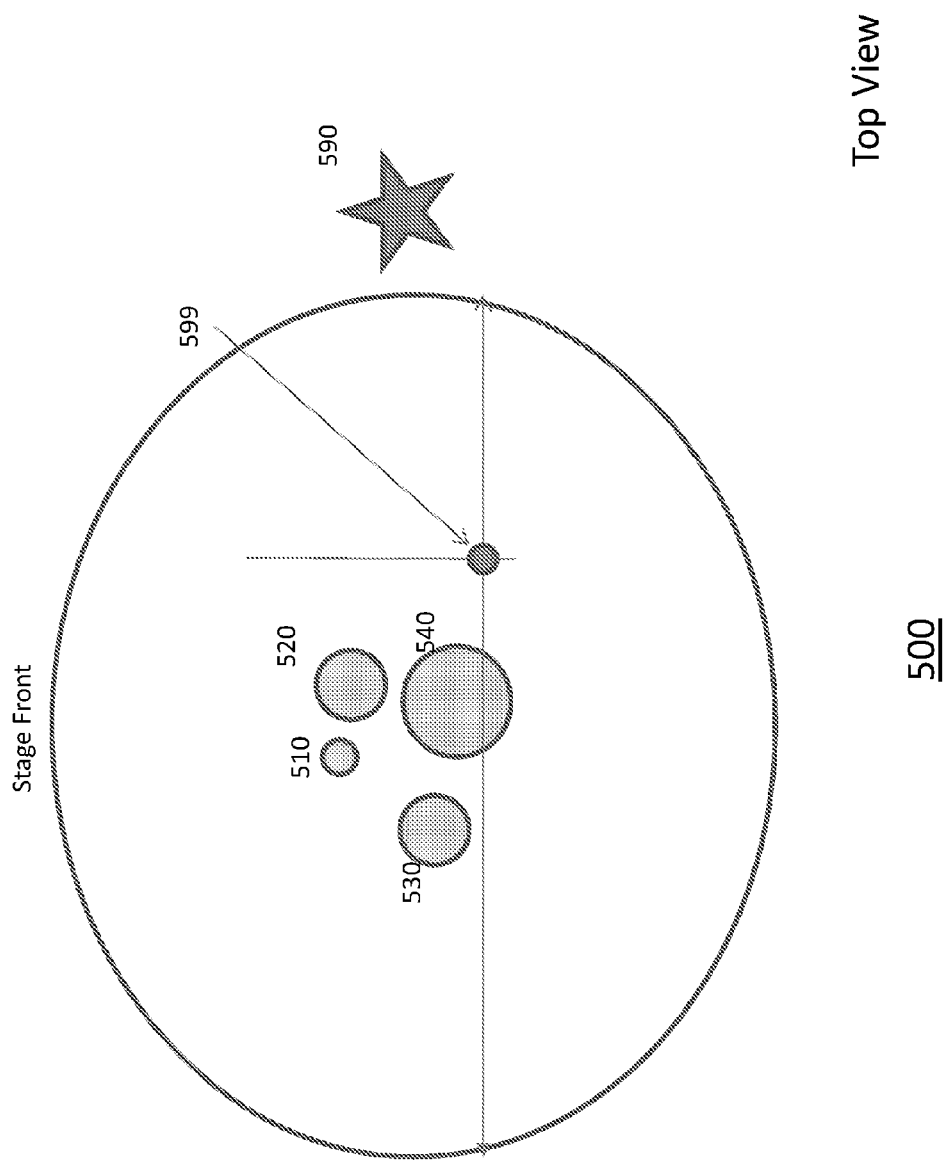
FIG. 5 sets forth an environmental arrangement having multiple sound sources with a listener at a particular location in relation to the multiple sound sources towards the side rear of a stage.

FIG. 5 sets forth an environmental arrangement having multiple sound sources 500 with a listener 590 at a particular location in relation to the multiple sound sources towards the side rear of a stage. From FIG. 5, the listener will likely have a perceived sound source aggregate center originating at 599 at a particular point in time, using calculations associated with the standard relationship, As a result, the focus of the listener 590 will generally be towards that perceived center point 599 and may not focus towards specific highlights or performance effects that are associated with the sound sources and their specific characteristics, particularly those towards the front of the stage. Unfortunately, the listener may not fully engage with the performance for a level of enjoyment as originally intended because of the listener's perceived sound source center point.

Figure 6:
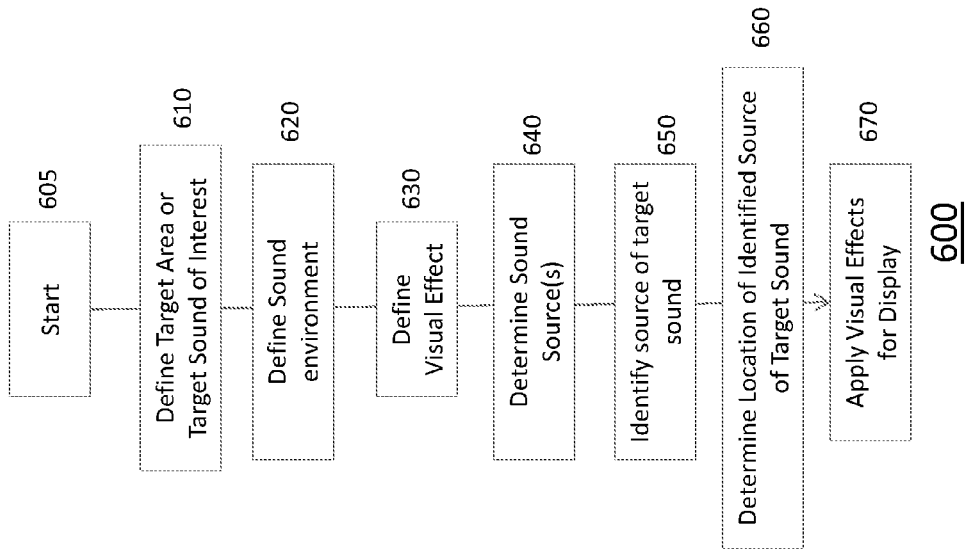
FIG. 6 sets forth a flowchart of the present invention in accordance with one or more embodiments.

FIG. 6 sets forth a flowchart 600 of the present invention in accordance with one or more embodiments. From FIG. 6, the process 600 begins at 605. At 610, a sound source is identified as being a target of interest for the process. For instance, in one embodiment, a user may identify one or more sound target characteristics for targeting. Sound target characteristics, by example, may include frequency range, decibel level, pitch range, loudness range, directional location, and period of time. The defined one or more sound target characteristics are received as input by the process for determination and identification of sound sources in a defined environment. It will be appreciated that in the absence of sound target characteristics, a default set of sound target characteristics may be utilized with the present invention.

Further from FIG. 6, the sound environment is defined at 620. A sound environment may be, for instance, a music hall, soundstage, venue, outdoors, indoors, etc., whereby it is intended to define a location where sources of sound to be detected shall be anticipated to emanate from.

At 630, an effect is identified for use by the present invention. As used herein, the term indicia is intended to be far reaching where an indicia may be visual, audible or tactile in manner. For instance, an indicia may include but not be limited to a visual effect, audible effect, tactile effect, visual image, cartoon, character representation, video, anime, hologram, light beam, projecting fire, animation, and combinations thereof, for display in relation to a detected target sound or determined reference sound location.

Further an indicia may one or more images for instance where each image or motion image is displayed at a particular predetermined time or in response to a particular predetermined sound characteristics, or both. For example, in one embodiment, a visual indicia is one or more of a holographic image displayed in relation to a determined reference sound position at intervals defined by one or more predetermined times. By further exemplar, where the environment a stage of a band, the indicia may be a hologram or a holographic image of a person, anime, icon, etc., which may have movement associated with the imagery or may have movement in response to sounds detected by the present invention.

Further from FIG. 6, at 640, using the sound target characteristics defining the sound and the defined sound sources to be targeted, sound sources are identified within the environment using sensing apparatus of the present invention. Sound sensing apparatus may include any sound sensing device or means, including human, in which the sound may be determined to be present. In general, sensors capable of detecting air pressure changes may act as devices suitable with the present invention. Other examples may include microphones, audio capture devices, air pressure sensors, soundwave detectors, acoustic cameras, electronic control logic, sound sensor, listening devices, decibel triggers, speakers, and hydrophones, etc.

At 650, positional locations of the identified sound sources are determined using output of the sound sensing devices as input to a first location processor of the present invention. In one or more preferred embodiments, an array of microphones set at a fixed distance from a target reference point are utilized as sound sensing apparatus. Output from the microphone array is provided as input to the first location processor. The first location processor receives the array information and determines a first location of the targeted sound source, at a first instance in time.

For instance, in a further preferred embodiment, a microphone array of 30 microphones are set along a common x-axis reference plane in relation to the sound source's target reference frame. When the sound source transmits the sound to be sensed by the present invention, the sound is received non-uniformly by the microphone array. Since each microphone of the array is at a fixed distance in relation to one another and to the sound source target reference frame, the present invention can calculate a location position of the sound source target, at the time, t1, of the sound transmission. The first location processor of the present invention then determines a first location in relation to the target reference frame at t1.

A further embodiment includes the use of multiple microphone arrays where each array may vary in the number of microphones a part of the defined array and the location of each array in relation to the target reference frame may also differ. For this embodiment, when the sound source transmits the sound to be sensed by the present invention, the sound is received non-uniformly by the plurality of microphone arrays. Since each microphone of each array is at a fixed distance in relation to one another, to each array, and to the sound source target reference frame, the present invention can calculate a location position of the sound source target, at the time, t1, of the sound transmission.

In a further embodiment, the arrays are positioned multi-dimensionally around the target sound source. The first location processor of the present invention then determines a first location in relation to the target reference frame at t1.

It will be appreciated that in each of the referenced embodiments above, the positional location of the targeted sound source can be identified with particular accuracy.

Continuing from FIG. 6, at 660, output from the first location processor is provided as input to a first referential processor which associates the location information of the targeted sound source at t1 with the target reference axis, thereby determining the location of the identified source of target sound. The location of the identified sound source may also be used a reference location in the defined environment where the indicia of the present invention may be mapped to for positioning in relation to display, sound, appearance, etc. At 670, the visual effects (i.e., indicia) may be mapped and displayed in relation and proximity to the reference sound source.

Figure 7:
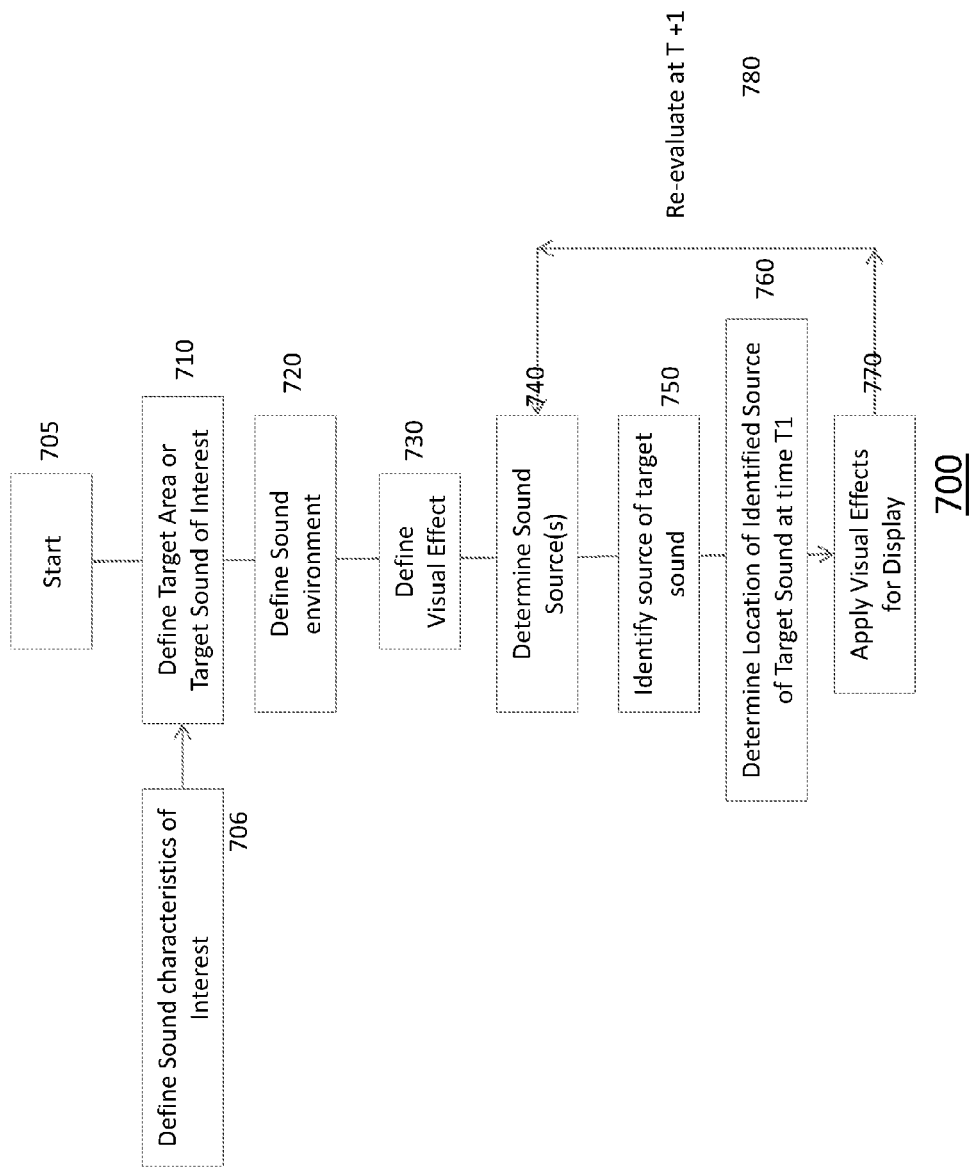
FIG. 7 sets forth a flowchart of the present invention in accordance with one or more embodiments having a dependence on one or more predetermined times.

FIG. 7 sets forth a flowchart 700 of the present invention in accordance with one or more embodiments having a dependence on one or more predetermined times. From FIG. 7, the process 700 begins at 705 for an initial time t1. At 706, sound characteristics are identified and used further define the sound source or target area for the process at 710. The sound environment is defined at 720 and at 730, an indicia effect is identified for use by the present invention. At 740, using the sound target characteristics defining the sound and the defined sound sources to be targeted, sound sources are identified within the environment using sensing apparatus of the present invention. At 750, positional locations of the identified sound sources are determined using output of the sound sensing devices as input to a first location processor of the present invention. In one or more preferred embodiments, the location may be a two axis coordinate or a three-dimensional coordinate. At 760, the location of the identified source of target sound is determined. At 770, the visual effects (i.e., indicia) may be mapped and displayed in relation and proximity to the reference sound source.

At 780, the process re-evaluates the determined sound source using the pre-defined characteristics in accordance with steps 740-770 for time periods following the initial time period of t1. Accordingly, for t1+1, at 740, using the sound target characteristics defining the sound and the defined sound sources to be targeted, sound sources are identified within the environment using sensing apparatus of the present invention for the next time period. The process continues until 770 where the visual effects may be mapped and displayed in relation and proximity to the reference sound source based on determined and identified sound information and indicia for time t1+1. Accordingly, the process may repeat for additional time periods.

Figure 8:
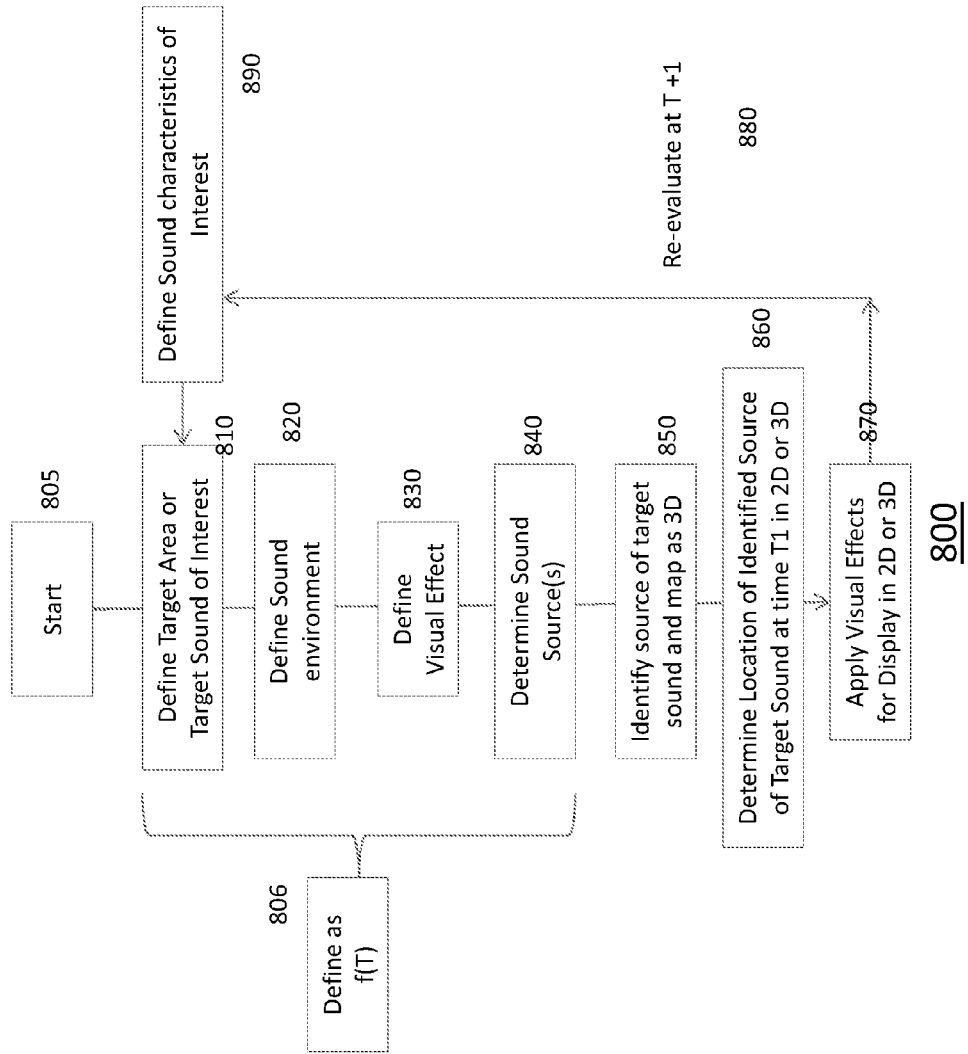
FIG. 8 sets forth a flowchart of the present invention in accordance with one or more embodiments where the definition of characteristic data also includes a dependence on one or more predetermined times.

FIG. 8 sets forth a flowchart 800 of the present invention in accordance with one or more embodiments where the definition of characteristic data also includes a dependence on one or more predetermined times. From FIG. 8, the process 800 begins at 805 for an initial time t1. At 806, reference of the characteristic identification association as a function is time is set forth. From the process, the sound source or target area for the process is defined at 810. The sound environment is defined at 820 and at 830, an indicia effect is identified for use by the present invention as a function of time. At 840, using the sound target characteristics, each being function of time, defining the sound and the defined sound sources to be targeted, sound sources are identified within the environment using sensing apparatus of the present invention. At 850, positional locations of the identified sound sources are determined. In one or more preferred embodiments, the location may be a two axis coordinate or a three-dimensional coordinate. At 860, the location of the identified source of target sound is determined. The process continues until 870 where the visual effects may be mapped and displayed in relation and proximity to the reference sound source based on determined and identified sound information and indicia. Accordingly, the process may repeat 880 for t1+1 (for additional time periods). At 880, since the characteristics are a function of time, new definitions may be set forth at 890 and the process will continue with newly defined characteristics for the following process at a next interval of time.

Figure 9:
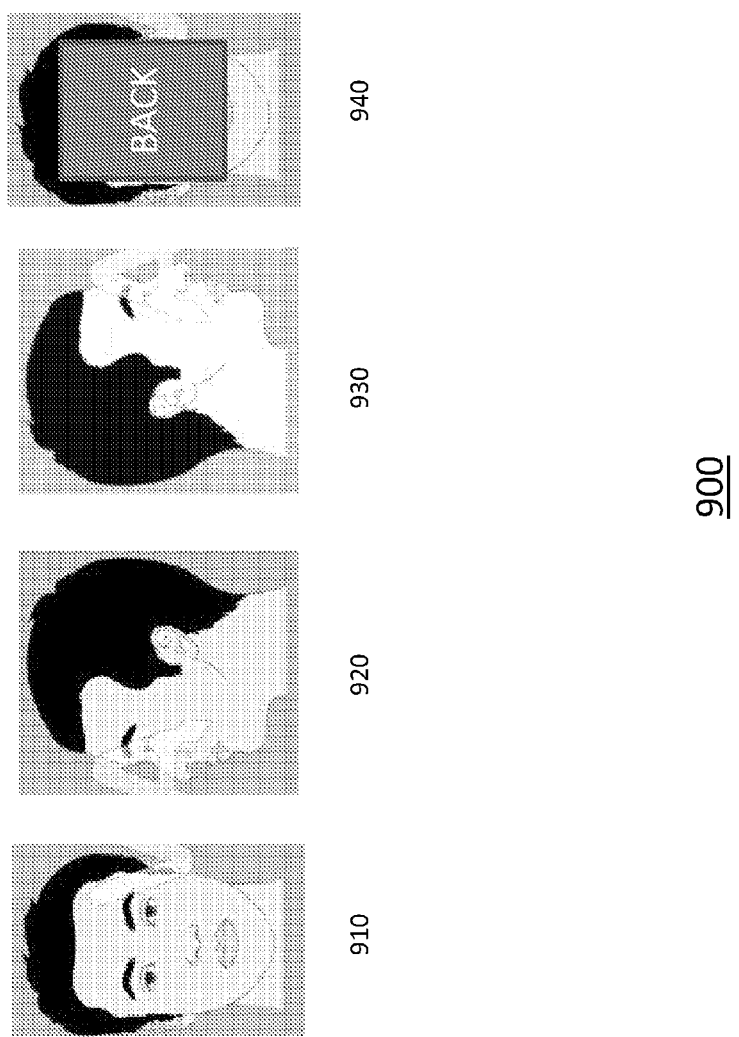
FIG. 9 sets forth an example of an interactive image effect for an indicia of the present invention.

FIG. 9 sets forth an example of an interactive image effect for an indicia of the present invention. From FIG. 9, the character indicia presented is includes having one or more anthropomorphistic characteristics. 910 depicts a face facing forward. 920 depicts a face facing to the left. 930 depicts a face facing to the right. 940 depicts a face facing backward. Such facial profiles may be projected onto a film or other display in a sound environment in proximity to the reference sound location by the present invention.

Interactively, the present invention is further able to provide for having a facial indicia of 910 having limited or no action until the detection of a particular sound or suite of sounds in relation to one or more sound characteristics. Upon detection of such target sounds using the present invention, the indicia of 910 may change by image or motion in the display such that the face may turn towards the reference sound location. For example, if a sound were detected to the left of the front facing indicia of 910, the face may then morph so as to continue to appear to "look" towards the reference sound location. In so doing, the 910 forward face transitions to the 930 face looking right (or the face's left) and toward the detected sound source. The face indicia 930 would continue until a future time interval or until a period in which the detected sound ceases. If the detected sound were to cease, the face indicia 930 may be caused to return to the 910 forward facing look.

Figure 10:
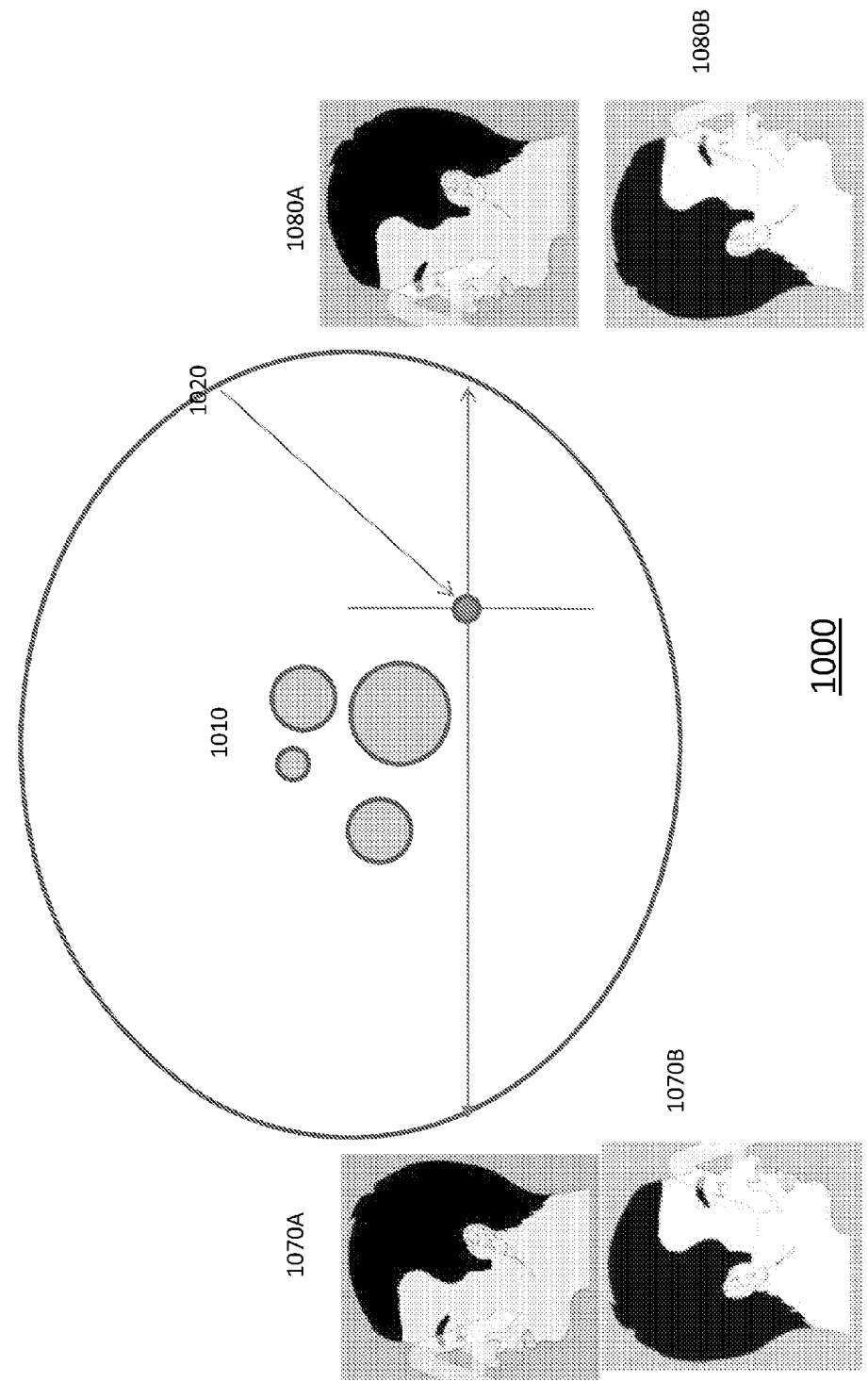
FIG. 10 depicts an example of an interactive image effect for an indicia of the present invention in accordance with one or more embodiments of the present invention.

FIG. 10 depicts an example of an interactive image effect for an indicia of the present invention in accordance with one or more embodiments of the present invention. From FIG. 10, sound can emanate in the environment of 1000 from sound sources 1010. Determining a first reference sound location in relation to the sound sources has been performed by the present invention, determining such reference location to be at 1020. In the example of the present invention, the facial indicia 1070 and 1080 include defined characteristics that also include movement to occur upon the detection of certain sound sources having predetermined sound characteristics.

From FIG. 10 and operatively, using the present invention, facial indicia 1070A is normally facing away from the sound source until a particular sound source is detected. Upon detection of the particular sound source, the away facing facial indicia 1070A transitions to the facing facial indicia 1070B which "appears" to be facing the sound source determined at 1020. Once the sound source ceases, the facial indicia may return to expression 1070A. Similarly, facial indicia 1080A is normally facing towards the sound source until a particular sound source is detected. Upon detection of the particular sound source, the towards facing facial indicia 1080A transitions to the away facing facial indicia 1080B which "appears" to be facing away from the sound source determined at 1020. Once the sound source ceases, the facial indicia may return to expression 1080A. In one aspect, the latter example of 1080A and 1080B may trigger on a detection of off-notes or inaccuracies in the detected sound, such as mistakes by instruments or singers, for instance. In another instance, indicia may be life-size images of performers who interact like the performers they represent.

Figure 11:
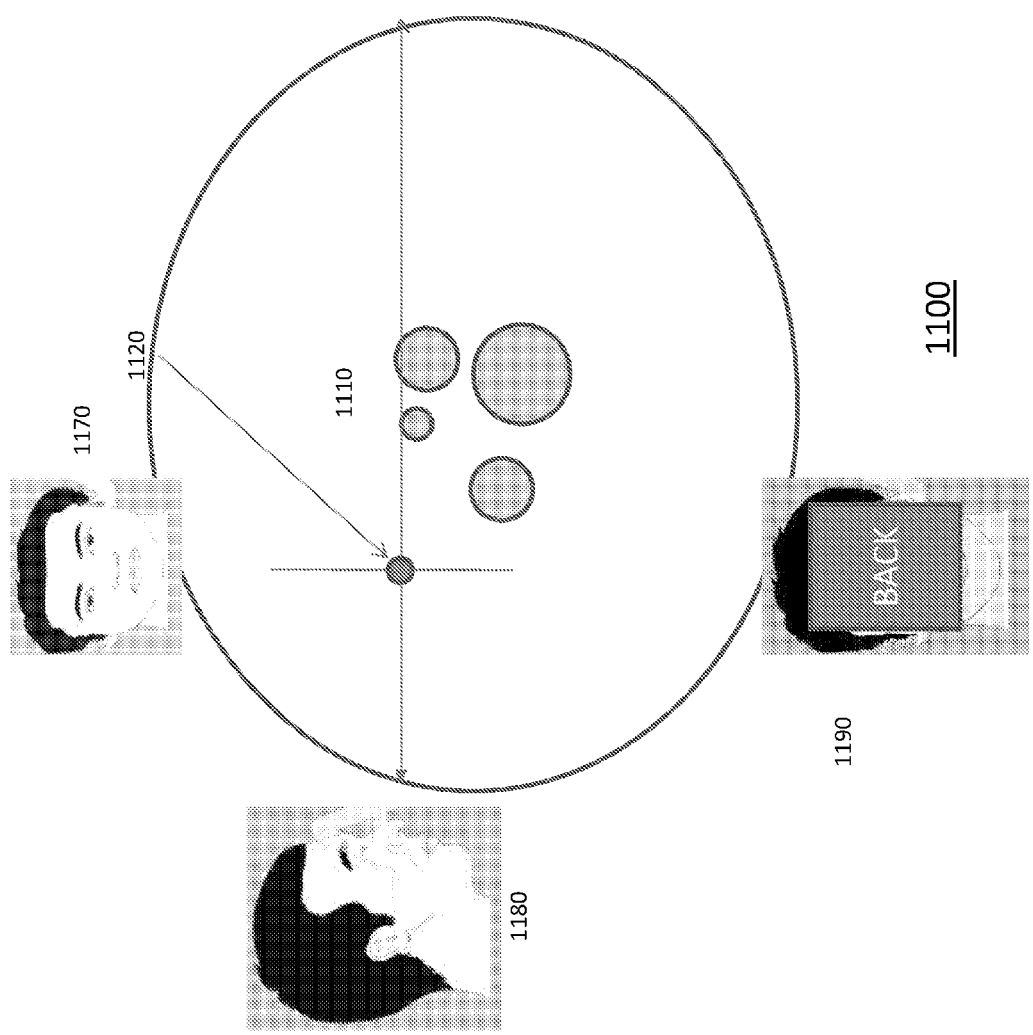
FIG. 11 depicts an example of multi-viewing interactive images for a plurality of indicia using the present invention in accordance with one or more embodiments.

FIG. 11 depicts an example of multi-viewing interactive images for a plurality of indicia using the present invention in accordance with one or more embodiments. From FIG. 11, sound can emanate in the environment of 1100 from sound sources 1110. Determining a first reference sound location in relation to the sound sources has been performed by the present invention, determining such reference location to be at 1120. In the example of the present invention, the facial indicia 1170, 1180 and 1190 each include specific defined characteristics that also include movement to occur upon the detection of certain sound sources having predetermined sound characteristics. In general, for this example, two (1170, 1180) of the three indicia are set to "appear" to watch the reference location 1120 while one (1190) includes settings to not watch the reference location (1120).

From FIG. 11 and operatively, using the present invention, facial indicia 1070A is normally facing away from the sound source until a particular sound source is detected. Upon detection of the particular sound source, the away facing facial indicia 1070A transitions to the facing facial indicia 1070B which "appears" to be facing the sound source determined at 1020. Once the sound source ceases, the facial indicia may return to expression 1070A. Similarly, facial indicia 1080A is normally facing towards the sound source until a particular sound source is detected. Upon detection of the particular sound source, the towards facing facial indicia 1080A transitions to the away facing facial indicia 1080B which "appears" to be facing away from the sound source determined at 1020. Once the sound source ceases, the facial indicia may return to expression 1080A. In one aspect, the latter example of 1080A and 10808 may trigger on a detection of off-notes or inaccuracies in the detected sound, such as mistakes by instruments or singers, for instance.

Figure 12:
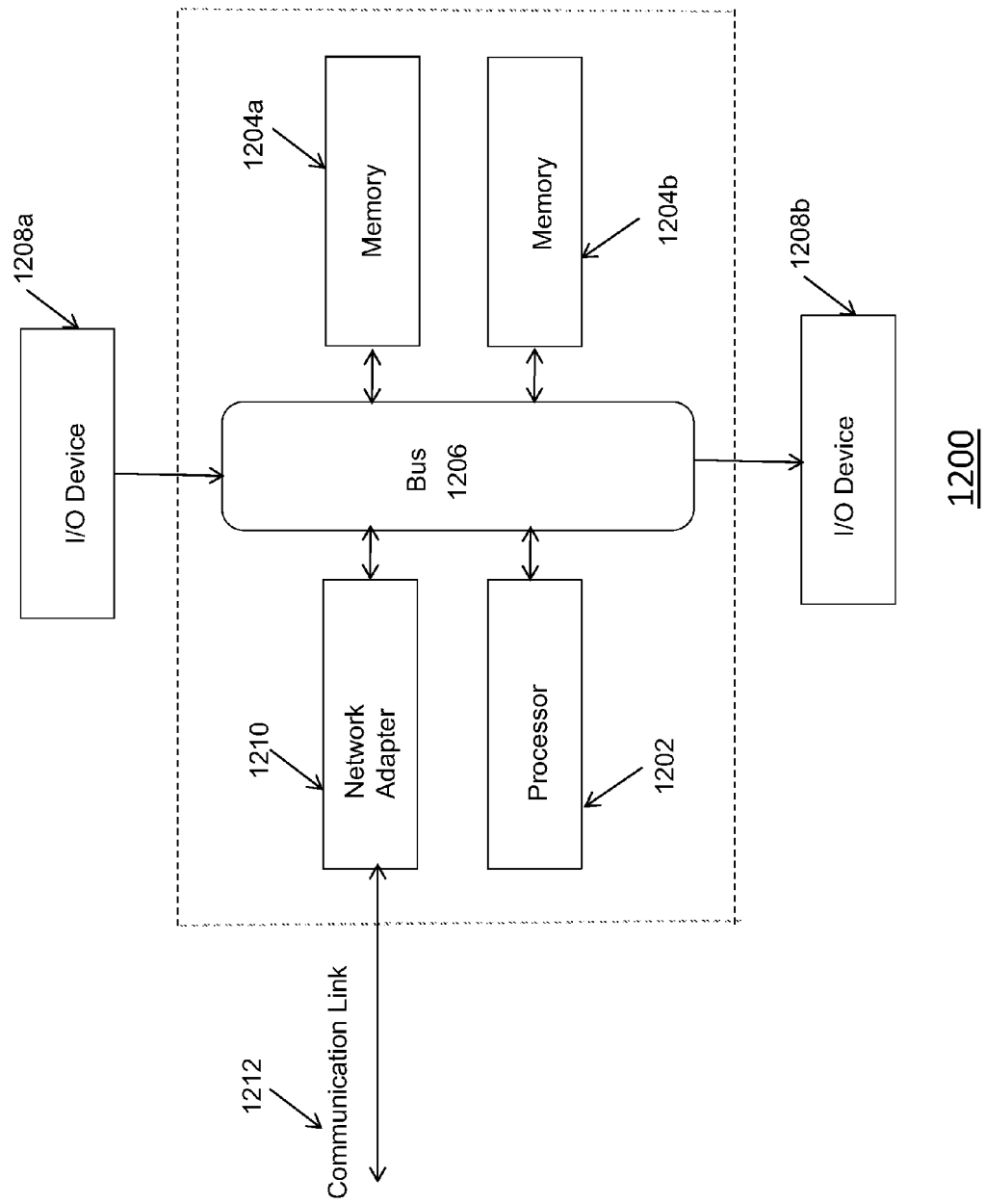
FIG. 12 illustrates a data processing system suitable for storing the computer program product and/or executing program code in accordance with one or more embodiments of the present invention.

FIG. 12 illustrates a data processing system 1200 suitable for storing the computer program product and/or executing program code in accordance with one or more embodiments of the present invention. The data processing system 1200 includes a processor 1202 coupled to memory elements 1204*a-b* through a system bus 1206. In other embodiments, the data processing system 1200 may include more than one processor and each processor may be coupled directly or indirectly to one or more memory elements through a system bus.

Memory elements 1204*a-b* can include local memory employed during actual execution of the program code, bulk storage, and cache memories that provide temporary storage of at least some program code in order to reduce the number of times the code must be retrieved from bulk storage during execution. As shown, input/output or I/O devices 1208*a-b* (including, but not limited to, keyboards, displays, pointing devices, etc.) are coupled to the data processing system 1200. I/O devices 1208*a-b* may be coupled to the data processing system 1200 directly or indirectly through intervening I/O controllers (not shown).

Further, in FIG. 12, a network adapter 1210 is coupled to the data processing system 1202 to enable data processing system 1200 to become coupled to other data processing systems or remote printers or storage devices through communication link 1212. Communication link 1212 can be a private or public network. Modems, cable modems, and Ethernet cards are just a few of the currently available types of network adapters.

Additionally, in one or more preferred embodiments, the data processing system 1200 of FIG. 12 may further include logic and controllers suitable for executing program code in accordance with one or more embodiments of the present invention. For instance, the data processing system 1200 may include a plurality of processors at 1202, wherein each processor may pre-process, process or post-process data (such as but not limited to acoustic, image or tactile) that is received or transmitted in relation to the environment, sounds and effects in the environment and/or preference of a user of the present invention. The plurality of processors may be coupled to memory elements 1204*a-b* through a system bus 1206, in respect to their processing with the present invention. A plurality of input/output or I/O devices 1208*a-b* may be coupled to the data processing system 1200 directly, in association with a respective processor, or indirectly through intervening I/O controllers (not shown). Examples of such I/O devices may include but not be limited to microphones, microphone arrays, acoustic cameras, sound detection equipment, light detection equipment, etc.

In one or more preferred embodiments, software operative for the present invention may be an application, remote software or operable on a computer, smartphone, or other computer-based device. For instance, sound detected from a sound source such as iphone may be used with the present invention where software of the invention is arranged with a microphone array and acoustic cameras to detect sound sources from the iphone and display a visual image at the iphone in accordance with one or more embodiments of the present invention. It is envisioned that the present device may be used in most any environment and application including those involving but not limited to rock performance, video performance, theater, characterization and/or theatrics involving a live/dead performer, cartoon applications, interactive electronic and virtual forums, homeland security needs, security residential, etc.

Figure 13:
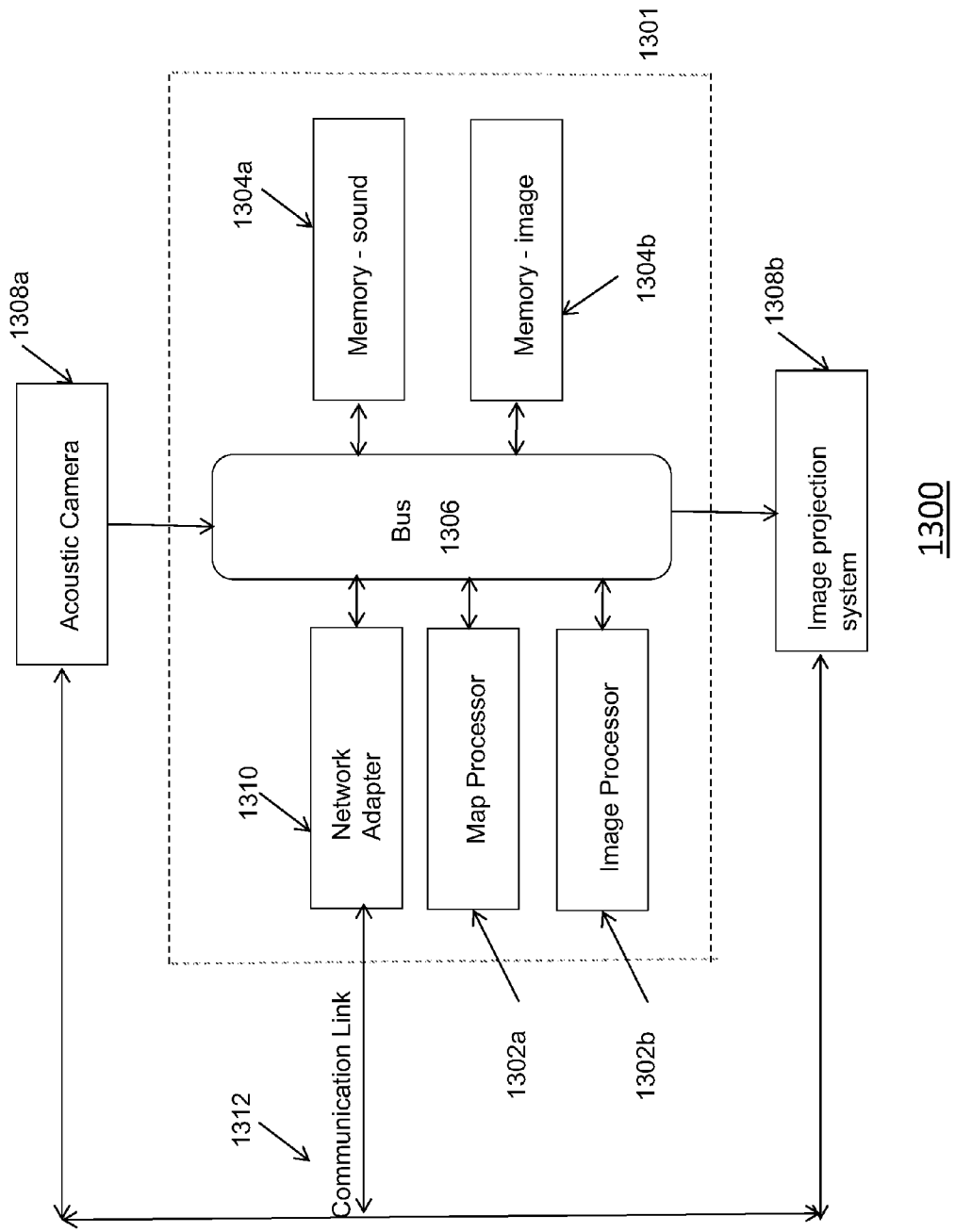
FIG. 13 illustrates an apparatus arrangement of the present invention including a data processing system suitable for storing the computer program product and/or executing program code in accordance with one or more embodiments of the present invention.

FIG. 13 illustrates an apparatus arrangement of the present invention including a data processing system 1300 suitable for storing the computer program product and/or executing program code in accordance with one or more embodiments of the present invention. The apparatus of 1300 includes an acoustic camera 1308*a*, for input of sound pressures and sound information associated with the environment, an image projection system 1308*b*, for output of processed image information to be displayed as a product of the processing of the apparatus, and a data processing sub-system 1301. The data processing sub-system 1301 includes a map processor 1302*a* (for processing received sound information from the acoustic camera input 1308*a*) and an image processor 1302*b* (for processing for output, image data in association with user defined characteristics), each coupled to memory elements 1304*a-b* through a system bus 1306. Memory element 1304*a*, for instance, can include user defined sound characteristics for identifying targets of interest with regard to sound in an environment. Similarly, memory element 1304*b*, for instance can include visual image data and user defined characteristics for application of visual image data in relation to identified sound information in the environment. It will be appreciated that additional memory elements and arrangements of memory are also envisioned by the present invention.

Further from FIG. 13, memory elements 1304*a-b* can include local memory employed during actual execution of the program code, bulk storage, and cache memories that provide temporary storage of at least some program code. Further memory elements or controllers (not shown) can additionally provide real-time, near real-time, and predetermined time instructions for determining steps when data capture, processing, and data display are performed by the present invention, essentially as a function of time.

Further, in FIG. 13, although the network adapter 1310 is diagrammatically coupled to the data processing system 1302 to enable data processing system 1301 to become coupled to other data processing systems, storage devices, projection systems, and similar, through communication link 1312, the specific arrangement of communication linkages is not limited by the present invention. Communication link 1312 can be a private or public network, wired or wireless, and direct or indirect in connectivity. I/O devices for this and other embodiments of the present invention can include, but not be limited to microphones, microphone arrays, acoustic cameras, sound detection equipment, light detection equipment, imagery projection systems, display systems, electronic media, etc.

Figure 14:
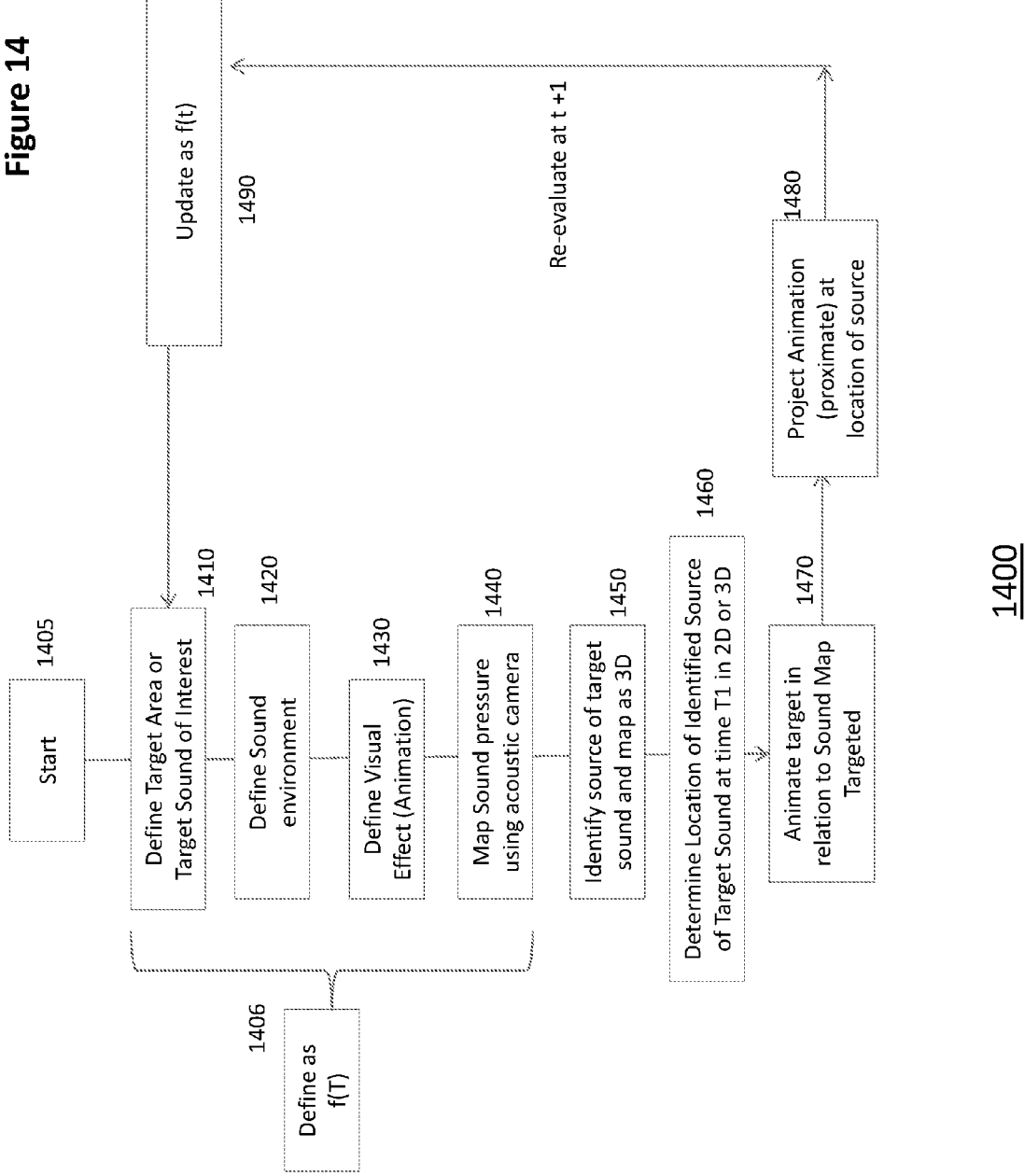
FIG. 14 sets forth a flowchart of the present invention in accordance with one or more embodiments where the definition of characteristic data also includes a dependence on one or more predetermined times using an input device of an acoustic camera and an output device of an image projection system.

FIG. 14 sets forth a flowchart 1400 of the present invention in accordance with one or more embodiments where the definition of characteristic data also includes a dependence on one or more predetermined times using an input device of an acoustic camera and an output device of an image projection system. From FIG. 14, the process 1400 begins at 1405 for an initial time t1. At 1406, reference of the characteristic identification association as a function is time is set forth. From the process, the sound source or target area for the process is defined at 1410. The sound environment is defined at 1420 and at 1430, a visual effect (such as animation for instance) is identified for use by the present invention as a function of time. At 1440, using the sound target characteristics, each being a function of time, defining the sound and the defined sound sources to be targeted, sound sources are identified within the environment using the acoustic camera with the present invention. Preferably, the acoustic camera provides a mapping of the sound pressures detected in the environment and the data is input for processing by the present invention.

At 1450, positional locations of the identified sound sources are determined. In one or more preferred embodiments, the location may be a two axis coordinate or a three-dimensional coordinate. Similarly, additional processing by the present invention may provide conversion processing for two-dimensional location information to be converted to three-dimensional information. At 1460, the location of the identified source of target sound is determined. The process continues until 1470 where the visual effects are arranged in accordance with the user defined characteristics and are mapped in relation and proximity to the reference sound source based on determined and identified sound information and visual image data and preferences. At 1480, the visual image to be displayed is processed and arranged for display by the image projection system of the present invention. Using the present invention, the projection may display an image directly, indirectly, proximate to, distal from, at, towards or across a target location, whether two-dimensional or three-dimensional.

Accordingly, the process is then repeated at 1490 for t1+1 (for additional time periods). At 1490, since the characteristics are a function of time, new definitions may be set forth at 1410, or at other steps of the process if no changes occur with prior steps, and the process will continue with defined characteristics, acquired data, processed data, and data readied for output in accordance with the present invention, and also preferably, as a function of time for a time period following.

Figure 15:
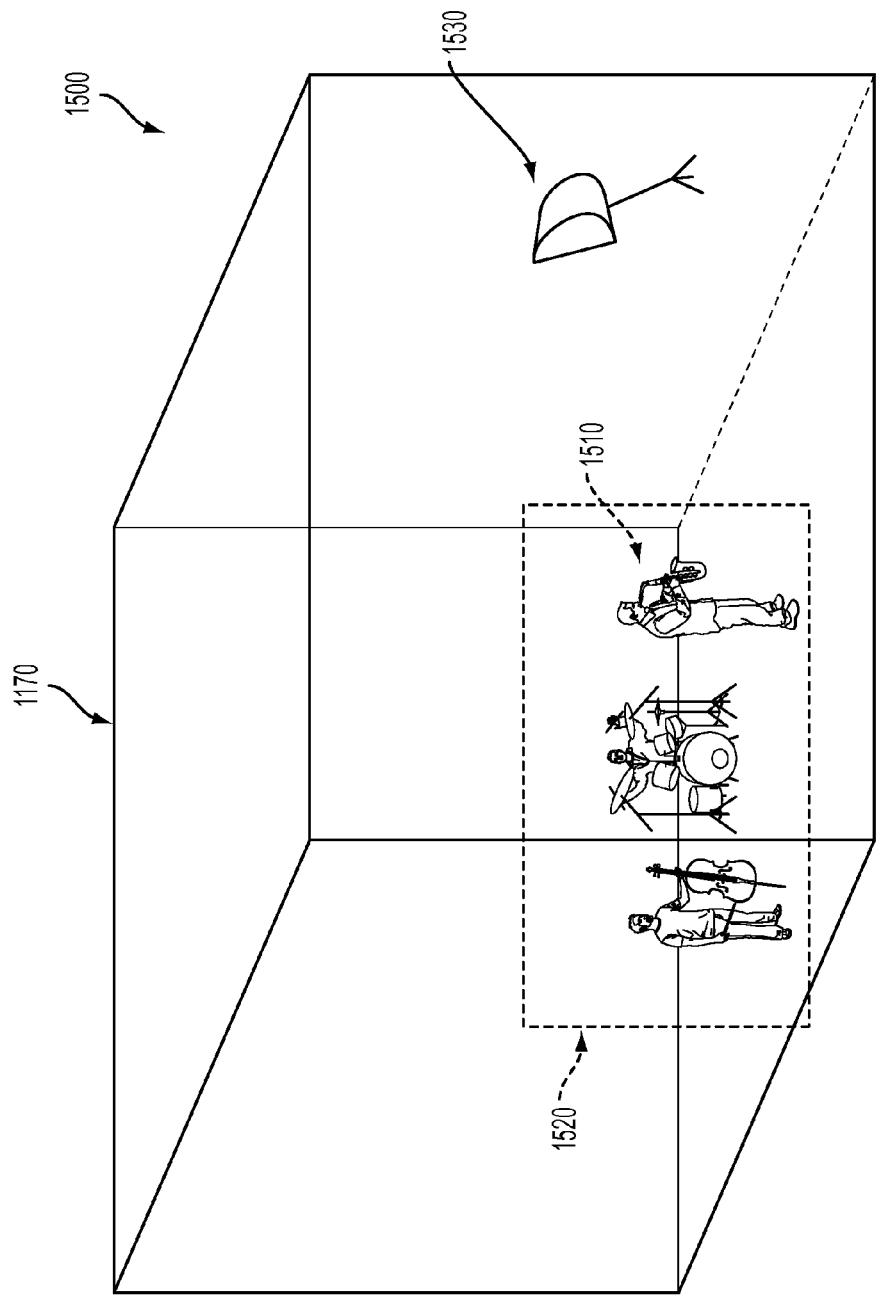
FIG. 15 illustrates an environment in which the present invention is in operation.

FIG. 15 illustrates an environment 1500 in which the present invention is in operation. From FIG. 15, the environment 1500 includes a sound source 1510, a target area or target reference frame 1520, and a sound detection and receiving device 1530. Preferably, in one or more embodiments, the sound source 1510 can be a group of musicians, a suite of sound generating equipment, stage performers, an animated movie, a single person, etc. Preferably, in one or more embodiments, the target reference frame or target area 1520 is defined to be the physical area in which detection of sound will occur where the target area may be, but is not so limited, a subset of the overall physical space available. A target area preferably will be defined by a user of the present invention or by default values for the present invention, where examples may include a 20'×20'×10' area of the center stage where a live band is performing within a 100'×100'×50' enclosure. Further, a receiving device is to be placed within the overall physical space and arranged to receive sound information from the sound source in the target area for optimal use by the present invention. In one or more preferred embodiments, the receiving device is an acoustic camera.

Figure 16:
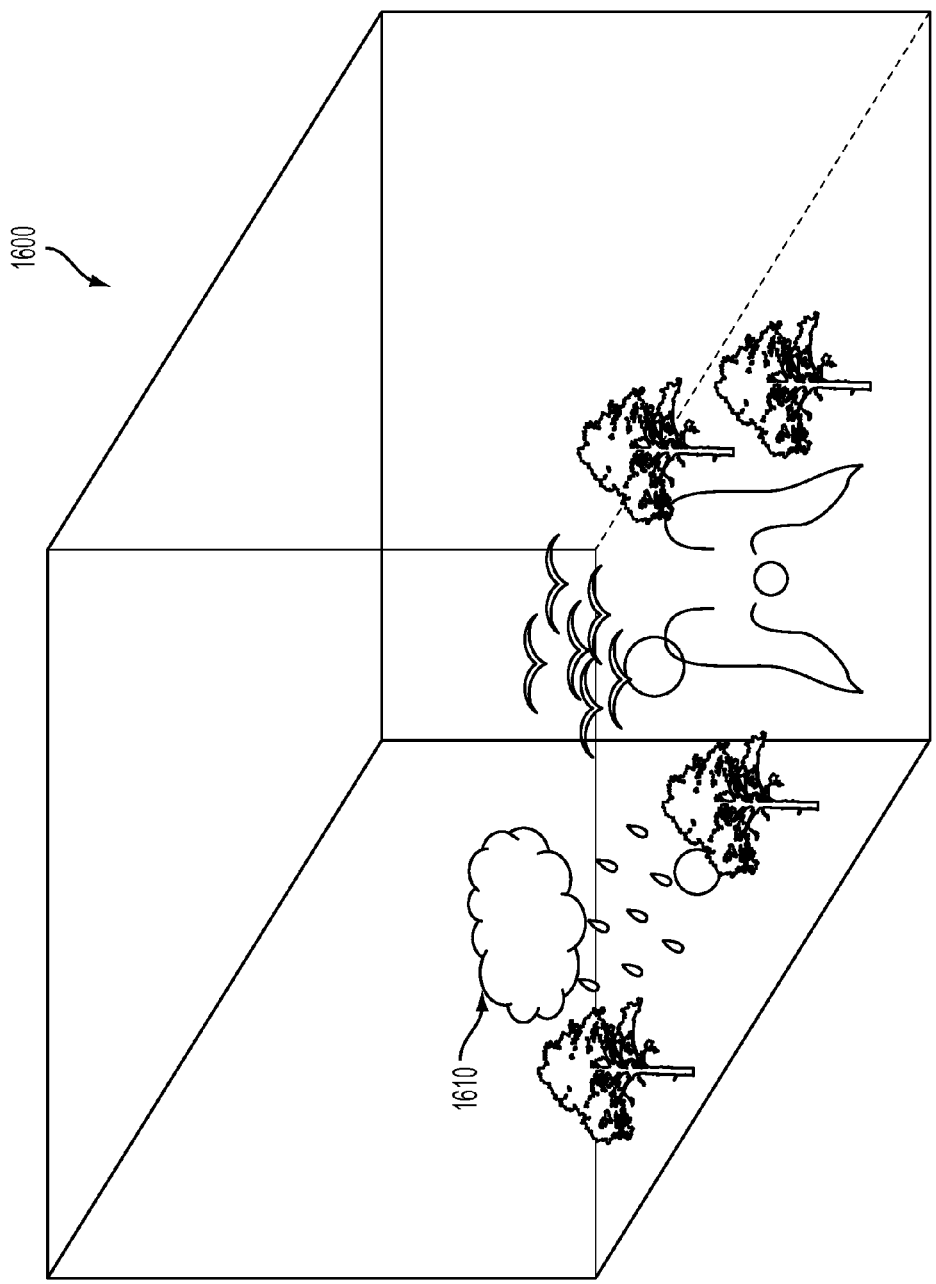
FIG. 16 illustrates an environment 1600 in which the present invention is in operation using sound animation in real-time; and, FIG. 17 illustrates an environment in which the present invention is in operation and projecting holographic animated imagery with live performers at a concert event.

FIG. 16 illustrates an environment 1600 in which the present invention is in operation using sound animation in real-time. From FIG. 16, the environment 1600 includes a sound source, a target area or target reference frame, and a sound detection and receiving device (not shown). Animated imagery 1610 is depicted within the environment 1600. Animated imagery is the selected indicia to be displayed, visually, within the environment in accordance with one or more user-defined characteristics of a preferred visual effect. The selected animated imagery is arranged to be processed in real time so the imagery is projected proximate to and towards the target area in relation to detected sound information. Preferably, the animated imagery is responsive to the detected sound information (such as sound pressure, frequency, pitch, decibel, etc.) such that the animated imagery interacts with the sound pressure. For instance, where detected sound pressures increase and decrease to reflect an increasing and then decreasing loudness of sound, images of animated flowers, clouds, angels wings and the like can increase and decrease in size, visual transparency, motion, and color intensity and/or lighting effect, for example. It will be appreciated that using the present invention there are many variations available and that the present invention is not so limited to the listings above.

Figure 17:
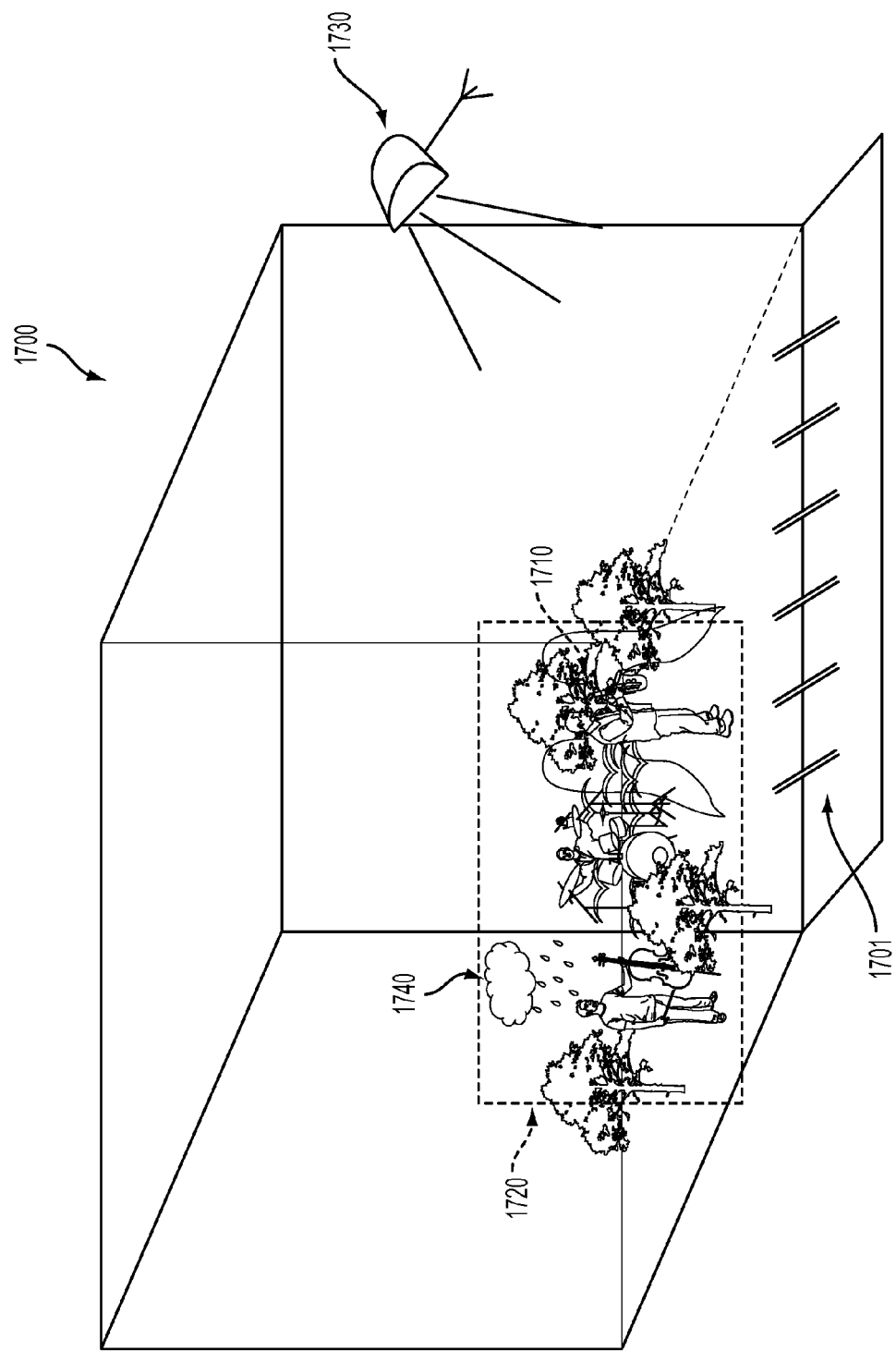

FIG. 17 illustrates an environment 1700 in which the present invention is in operation and projecting holographic animated imagery with live performers at a concert event. From FIG. 17, the environment 1700 includes a sound source 1710, a target area or target reference frame 1720, a sound detection and receiving device 1730, and a projection system (not shown). From FIG. 17, an audience is depicted at 1701. Preferably, in one embodiment, the sound source 1710 is a performing group of musicians, the target reference frame 1720 is defined proximate to the center stage, the receiving device 1730 is an acoustic camera, and the projection system provides for a three-dimension holographic display capability from a defined visual image in relation to predetermined characteristics.

From FIG. 17, the visual animation 1740 are projected by the projection system onto the stage of the environment 1700 proximate to the target area 1720 in relation to the sound information detected by the acoustic camera. Preferably, as a function of time, images displayed are updated in relation to detected and processed sound information by the present invention. Alternatively, images are displayed based upon a predetermined set of images, motion, visualization, etc., for a period of time.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims. Many other embodiments of the present invention are also envisioned.

Any theory, mechanism of operation, proof, or finding stated herein is meant to further enhance understanding of the present invention and is not intended to make the present invention in any way dependent upon such theory, mechanism of operation, proof, or finding. It should be understood that while the use of the word preferable, preferably or preferred in the description above indicates that the feature so described may be more desirable, it nonetheless may not be necessary and embodiments lacking the same may be contemplated as within the scope of the invention, that scope being defined by the claims that follow.

As used herein detection and listening locations of the present invention may be positioned or located anywhere in the environment where a desired sound source or series of sound sources may originate from. For instance, an array of microphones may be placed along an x-axis, y-axis and/or z-axis in relation to the sound sources of interest.

As used herein the terms device, appliance, terminal, remote device, wireless asset, etc. are intended to be inclusive, interchangeable, and/or synonymous with one another and other similar communication-based equipment for purposes of the present invention though one will recognize that functionally each may have unique characteristics, functions and/or operations which may be specific to its individual capabilities and/or deployment.

What is claimed is:

1. A method for defining a reference sound position and producing an indicia proximate thereto in relation to one or more sound characteristics at a predetermined location, comprising:
    defining a plurality of sound characteristics to be detected; wherein the plurality of sound characteristics comprise frequency range, decibel level, and loudness range; pitch range, directional location, and period of time;
    detecting at least one target sound in relation to the plurality of sound characteristics; wherein the at least one target sound is detected using one or more of a soundwave detector, acoustic camera, or electronic control logic;
    determining the referenced sound position in relation to the detected target sound; and,
    producing the indicia proximate to the determined referenced sound position;
    wherein the indicia is one or more of a: visual image, cartoon, character representation, video, anime, hologram, light beam, animation, and combinations thereof, for display in relation to the detected target sound; wherein producing the indicia further comprises displaying the indicia in relation to the referenced sound position in accordance with one or more predetermined times; wherein the indicia is one or more of a holographic image displayed in relation to the referenced sound position at intervals defined by one or more predetermined times.

2. The method of claim 1, wherein the referenced sound position includes a two-dimensional position in relation to the predetermined location frame.

3. The method of claim 2, wherein the referenced sound position includes a three-dimensional position in relation to the predetermined location frame.

4. The method of claim 1, wherein the soundwave detector is one of a(n): microphone, electronic sound sensor, listening device, decibel trigger, speaker, person, and hydrophone.

5. A method for determining a reference sound source location and performing an indicia proximate to the reference sound location, in relation to one or more targeted characteristics of one or more sound sources in a predetermined sound environment, comprising:
    defining a plurality of target sound characteristics, wherein the plurality of sounds characteristics comprising frequency range, decibel level, pitch range, loudness range, directional location, and period of time;
    defining the plurality of target sound characteristics of the indicia as being one or more of visible, audible, and/or tactile;
    detecting at least one target sound in relation to the plurality of target sound characteristics in the sound environment; wherein the at least one target sound is detected using one or more of a soundwave detector, acoustic camera, or electronic control logic;
    determining the referenced sound source location in relation to the detected target sound; and,
    assigning the indicia to be performed proximate to the determined referenced sound source location; wherein the indicia is one or more of a: visual image, cartoon, character representation, video, anime, hologram, light beam, animation, and combinations thereof, for display in relation to the detected target sound; wherein assigning the indicia further comprises displaying the indicia in relation to the referenced sound position in accordance with one or more predetermined times; wherein the indicia is one or more of a holographic image displayed in relation to the referenced sound position at intervals defined by one or more predetermined times.

6. The method of claim 5, wherein the referenced sound source location includes either a two-dimensional or a three-dimensional coordinate position in relation to the sound environment.

7. The method of claim 5, wherein the indicia either appears to be interactive or not interactive in relation to the referenced sound source location.

8. A computer program product stored on a computer usable medium, comprising:
    a computer readable program means for causing a computer to control an execution of an application to perform a method for producing an indicia proximate to a first reference sound location in relation to a plurality of sound characteristics, comprising:
    defining the plurality of sound characteristics to be detected by a sound detector;
    wherein the plurality of sound characteristics comprise frequency range, decibel level, and loudness range;
    detecting at least one target sound in relation to the the plurality of sound characteristics; wherein the at least one target sound is detected using one or more of a soundwave detector, acoustic camera, or electronic control logic;
    determining the first reference sound location in relation to the detected at least one target sound; and,
    producing a predetermined indicia proximate to the first reference sound location; wherein the indicia is one or more of a: visual image, cartoon, character representation, video, anime, hologram, light beam, animation, and combinations thereof, for display in relation to the detected target sound; wherein producing the predetermined indicia further comprises displaying the indicia in relation to the referenced sound position in accordance with one or more predetermined times; wherein the indicia is one or more of a holographic image displayed in relation to the referenced sound position at intervals defined by one or more predetermined times.

9. The program product of claim 8, wherein the first reference sound position includes either a two-dimensional position or a three-dimensional position in relation to a first reference axis.

10. The program product of claim 9, wherein the predetermined indicia is one or more of a visible, audible or tactile-based projection projected in proximity to the first reference sound location at intervals defined by one or more predetermined times.

11. The program product of claim 9, wherein the predetermined indicia is responsively displayed in proximity to the first reference sound location by displaying an appearance of movement in relation one or more detected interactive sounds.

12. The program product of claim 11, wherein the predetermined indicia is an image having one or more anthropomorphistic characteristics.

13. A system for determining a reference sound source location and displaying one or more images proximate to the reference sound location, in relation to one or more predetermined sound characteristics for a sound environment, comprising:
 a sound detection device for detecting one or more sounds in the sound environment in relation to the plurality of predetermined sound characteristics; wherein the plurality of predetermined sound characteristics comprise frequency range, decibel level, loudness range; pitch range, directional location, and period of time; wherein the sound detection device is an acoustic camera and the image display device is a three-dimensional holographic display system
 a processor for processing detected sound information in relation to reference sound source location of the sound environment and generating one or more images for display proximate to the reference sound source location,
 an image display device for displaying the generated one or more images proximate to the reference sound source location; wherein the one or more images includes one or more of: one or more visual images, cartoon, character representation, video, anime, hologram, light beam, animation, multimedia, and combinations thereof;
 wherein the one or more images are displayed as a function of time and one or more characteristics of the one or more images is capable of visual interaction with the detected one or more sounds in the sound environment.

14. The system of claim 13, wherein the one or more images includes one or more of: one or more visual images, cartoon, character representation, video, anime, hologram, light beam, animation, multimedia, and combinations thereof.

15. The system of claim 13, wherein the reference sound source location is one of a two-dimension position or a three-dimensional position in relation to the sound environment.

16. The system of claim 13, wherein the sound source is a musical group, the environment is a concert location, the detection device is an acoustic camera, and the one or more images include animation.

17. The system of claim 16, wherein the animation includes one or more of: angel's wings, hologram, interactive video, cartoon, and a celebrity image.

* * * * *

UNITED STATES PATENT AND TRADEMARK OFFICE
CERTIFICATE OF CORRECTION

| | | |
|---|---|---|
| PATENT NO. | : 8,704,070 B2 | Page 1 of 1 |
| APPLICATION NO. | : 13/782402 | |
| DATED | : April 22, 2014 | |
| INVENTOR(S) | : John Beaty and Jamaal Sawyer | |

It is certified that error appears in the above-identified patent and that said Letters Patent is hereby corrected as shown below:

Title Page
Item (72), Inventors
Change "Jammal Sawyer" to read -- Jamaal Sawyer --

Signed and Sealed this
Eighth Day of July, 2014

Michelle K. Lee
*Deputy Director of the United States Patent and Trademark Office*